Aug. 29, 1933.   A. P. ANDERSON   1,924,827
PRODUCTION OF PUFFED PRODUCTS
Original Filed Nov. 8, 1927   4 Sheets-Sheet 1
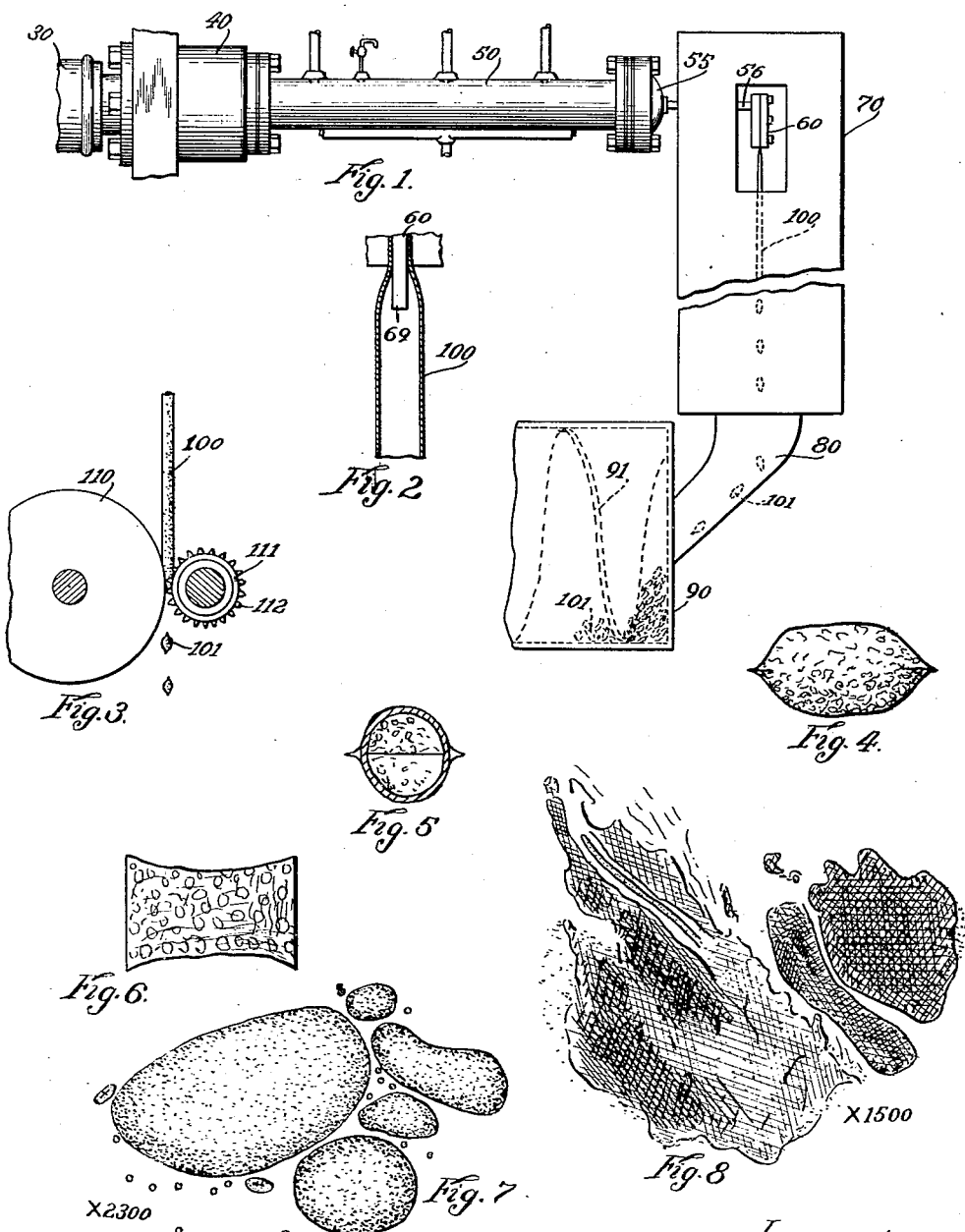
Inventor:
Alexander Pierce Anderson.
By Jones, Addington, Ames & Seibold,
Attys.

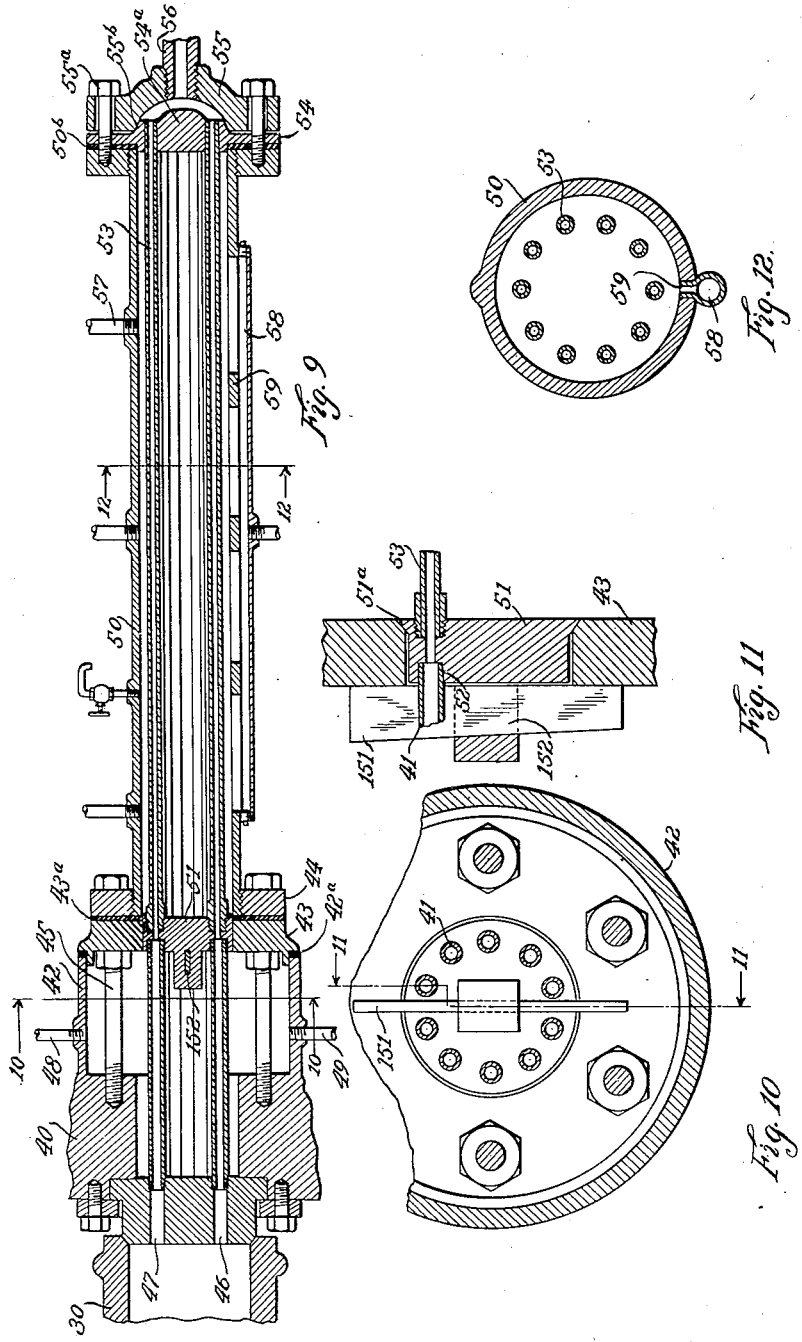

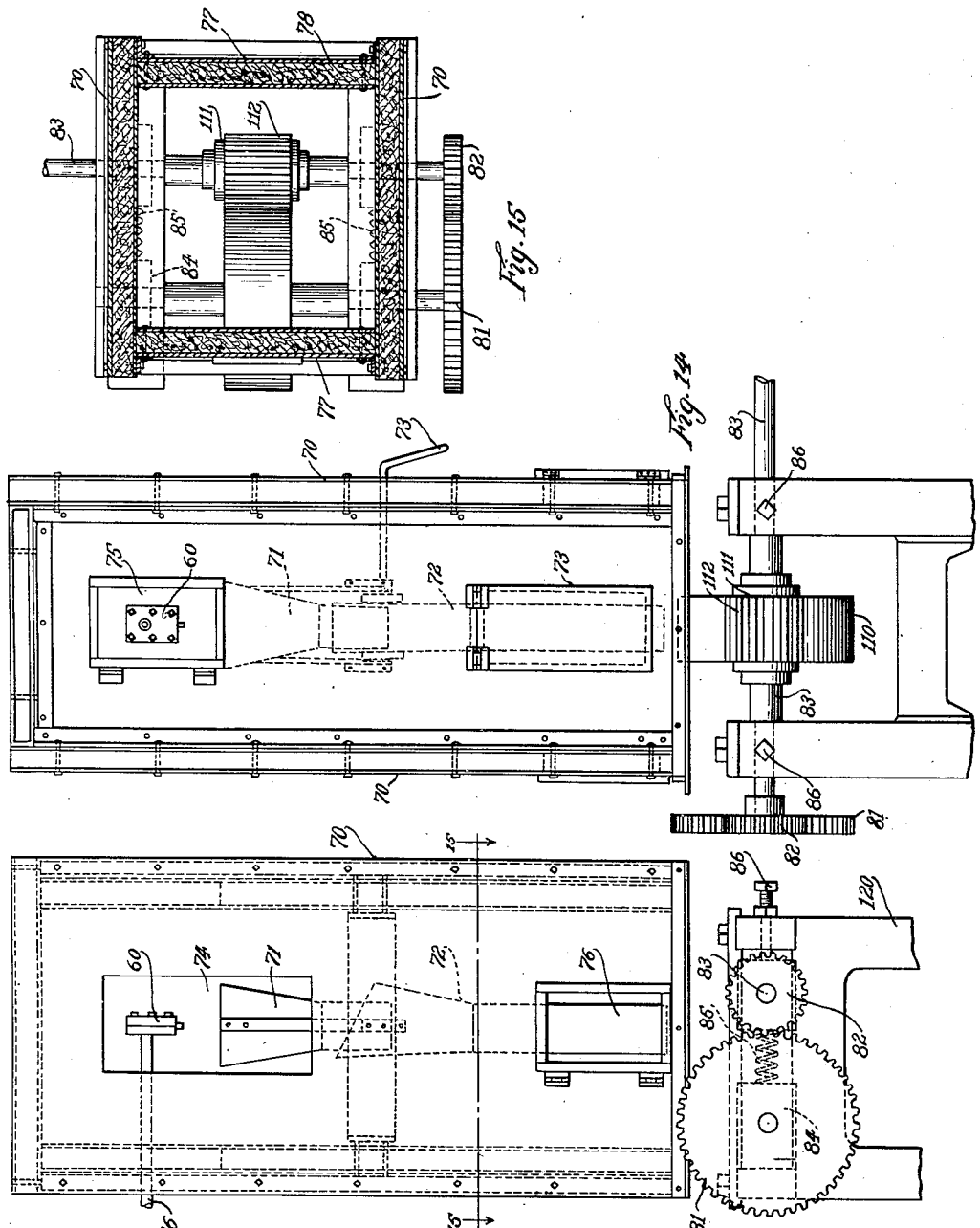

Aug. 29, 1933.    A. P. ANDERSON    1,924,827
PRODUCTION OF PUFFED PRODUCTS
Original Filed Nov. 8, 1927    4 Sheets-Sheet 4

Inventor:
Alexander Pierce Anderson,
By Jones, Addington, Ames & Seibold,
Attys.

Patented Aug. 29, 1933

1,924,827

UNITED STATES PATENT OFFICE 1,924,827

PRODUCTION OF PUFFED PRODUCTS

Alexander Pierce Anderson, Red Wing, Minn., assignor to Anderson Puffed Rice Company, Chicago, Ill., a corporation of New Jersey Original application November 8, 1927, Serial No. 231,925. Divided and this application February 25, 1932. Serial No. 595,085

16 Claims. (Cl. 99—2)

My invention relates to apparatus for the continuous production of a puffed, porous product. At present, the invention is considered to be of most importance in connection with food products, although in its broad aspects it is not limited to food products.

This application is a division of my co-pending application, Serial No. 231,925, filed November 8, 1927, and is a continuation in part of my United States Letters Patent No. 1,725,171.

One of the objects of my invention is to devise a way of puffing or rendering porous products from certain materials which have not heretofore been susceptible of such treatment.

Another object of my invention is to form individual hollow objects from vegetable materials, as cereals, tubers and certain fruits.

A further object of my invention is to devise a way in which certain materials, such, for instance, as flour, can be quickly transformed into porous cooked food products.

A further object of my invention is to devise a method of making cooked puffed food products which method is exceedingly flexible whereby variations can be readily made as to the degree of cooking and the degree of porosity of the product as well as in the shape.

In carrying out my invention in making puffed hollow food products, I may reduce food material containing starch and moisture to a state in which it will flow under pressure, subject this material to pressure and heat to render it plastic, tenacious and resistant to the escape of moisture; cause this material to be released from pressure through an orifice to cause the moisture therein to expand as steam and thereby disrupt the starch granules and puff the material; and subject this material to heat as it emerges from the orifice to form a crust on the outside of the same and to maintain the moisture within the material in a gaseous state while the material is drying to give it increased porosity. I may also inject into the plastic material, a gas, as for instance carbon dioxide, to increase the porosity of the product, or to enable variations to be made in the heat or other treatment. In some instances, where the walls of the material are thin, the crust may be substantially identical with the walls of the product.

The pressure and temperature used may vary depending on the material treated and the product derived. By this method plastic starch material and starch material flours may be greatly expanded and made porous, or "puffed", the resulting product being crisp in its structure, and resembling bread or crackers, or certain products like puffed rice and puffed wheat now on the market. Also, certain fruits, tubers and the like containing starch and comparatively large percentages of water can be quickly cooked, dried and made porous or puffed, converting them into food products. Also, by this method pure starches can be expanded in size and volume, exploding the starch granules into minute particles, making a porous puffed product.

In my prior methods of puffing material, as disclosed in my Patents Nos. 707,892; 769,289; 847,279; 900,093; 1,035,834; 1,035,835; 1,035,836; and 1,035,837 it was essential that the material for puffing be in a lump form, as grain, or particles of sufficient size to puff individually into definite expanded bodies which become enlarged copies of the original grain or lumps. Thus grains of rice, wheat, sago, tapioca, rolled up flour balls, pellets of corn flour and rolled up balls of pure starch could be puffed by my prior inventions. However, flours made from such grain could not be puffed without first being made up into lumps or pellets.

This limitation I have now overcome by my new process which is applicable to all flours, starches and mixtures of the same in my combination, and to farinaceous vegetable substances which could not be puffed by my previous methods.

My new process has this advantage also over my former process in that the material for treatment need not be in any air-dried condition but can have various percentages of moisture.

The process described in my above-mentioned patents depended essentially on steam pressures surrounding and within such grain or kernel. No other pressure, that is to say, no mechanical pressure was used. In my new process I depend largely on mechanical pressure in combination with steam or other expansive pressure for this purpose. Starch material flours are products made from very solid compact bodies, such as seeds, grains and the like which have been ground up or pulverized. In these grains nature has stored up in a very small space a large amount of food, the grains being very compact, in fact as compact as can be obtained by using a very high pressure on the flour made from this grain. I estimate that it requires a pressure of about five thousand pounds per square inch to reduce flour to a condition in which it is as solid and compact as it is in the grains of rice, wheat, corn and the like from which it is made. My method contemplates the use of very high pressure, in order to make the material acted on substantially as compact as it is when in the seeds or grains.

I also have found that it requires a steam pressure of about 175 pounds per square inch to disrupt starch granules and puff a grain of rice or wheat. Furthermore, starch grains before puffing must be cooked, not raw, so as to be plastic, tenacious and pliable. This requires a temperature of 140° F. and upwards, depending on the material under treatment. I have succeeded in combining all of these essential conditions in one process, including mechanical pressure, steam pressure cooking temperature, disruption of starch granules by expansion of steam, variation of moisture percentages and quick drying, making a final product which is greatly expanded and porous like bread, crackers, biscuits and the like.

Another advantage in my new process is that my mixture of flours, starches and so forth can be prepared and puffed together to form one product, a combination of all of them.

My new process does no depend on an expansive medium resulting from gas generated in fermentation due to yeast nor due to added chemicals, such as baking powders which generate carbon dioxide gas. It is well known that when yeast and baking powder are used for bread making, only certain flours like glutinous wheat flour, can be used.

In my new process, I do not depend on this property of the flour but depend on steam at high tension for the expansive medium, taking advantage of another property of starch materials and flours which I make use of, to wit: that when starch is heated up to a temperature of 250 to 375° F., especially when under pressure and having a substantial amount of water in it, e. g., 25 to 30%, it is plastic and tenacious, much the same as gluten. Since the material is plastic and tenacious, the particles resulting from the disrupted starch granules become binders and cement together not only all the starch contained in the material treated, but also any non-starchy substances, such as the bran gluten and broken-up cell walls. Of course, when the gluten material is used, the gluten aids in the expansion.

I may also assist the expansible force of the steam by means of gas, such as carbon dioxide gas injected into the dough or other material, so that when the material is subjected to high mechanical pressure the gas is evenly disseminated throughout the mass; and when the material is finally released the gas expands, assisting the steam in maintaining the material in a porous puffed condition and preventing the cells from collapsing. This gas may be introduced as such from a suitable source of supply, such as a cylinder of liquid carbon dioxide, or may be produced within the material by means of a ferment such as yeast, or any chemical means as in the case of baking powder.

By my present process I produce comparatively small individual puffed objects from cereals or from vegetables containing starch, such as potatoes, tubers and green bananas. However, my process is not limited in any way to the size and shape of the objects, as I am able to produce continuous lengths of puffed material by omitting the cutting step, as will be more fully described hereinbelow.

I will first describe my novel process in a general way, referring to drawings that form a part of the present specification.

In the said drawings:

Figure 1 is a side elevational diagrammatic view of the apparatus employed by me in carrying out my new puffing process for producing food products;

Fig. 2 is a detail of the extruding and puffing operation showing the material undergoing treatment at the stage at which it acquires its structurally expanded form;

Fig. 3 shows the method employed by me in cutting the expanded body of puffed material into individual pieces;

Fig. 4 is a side elevational view of a sealed hollow object produced by one form of my process;

Fig. 5 is a cross-section of the hollow object shown in Fig. 4;

Fig. 6 is a longitudinal section of the same;

Fig. 7 is a view of the appearance of an unbroken wheat-starch grain, enlarged 2300 diameters;

Fig. 8 is a view of the appearance of such starch grains after they have been puffed and disrupted as a result of going through my process, the enlargement in this case being 1500 diameters. Both Figs. 7 and 8 are sketches made from observations through a microscope;

Fig. 9 is a cross-sectional view of the cooking tubes and their surrounding steam jackets, connecting means etc., which correspond, on an enlarged scale, to the tubular apparatus shown in Fig. 1;

Fig. 10 is a cross-sectional view of the connecting tubes and steam jacket, along the line 10—10 in Fig. 9, looking in the direction of the arrows; and on a larger scale than Fig. 9;

Fig. 11 is a still further enlarged sectional view of connecting means employed in connecting the intermediate tubes and the cooking tubes, taken along the line 11—11 in Fig. 10, looking in the direction of the arrows in said figure;

Fig. 12 is a cross-sectional view, on a slightly larger scale than Fig. 9, of the said figure along the line 12—12 thereon, and looking in the direction of the arrows;

Fig. 13 is an elevational side view of the "primary oven" indicated in diagrammatic form in Fig. 1, showing the extruding nozzle or die; a swingable switching funnel, and the means for cutting off the extruded product;

Fig. 14 is similar to Fig. 13, but taken at right angles thereto, and looking against the end of the "primary oven" in a direction toward the cooking tubes and chamber shown in Fig. 9;

Fig. 15 is a partially sectional view of the primary oven shown in Fig. 13, along the line 15—15 thereon looking downward in the direction of the arrows; and is therefore also a top view of the cut-off device shown diagrammatically in Fig. 3;

Figure 16:
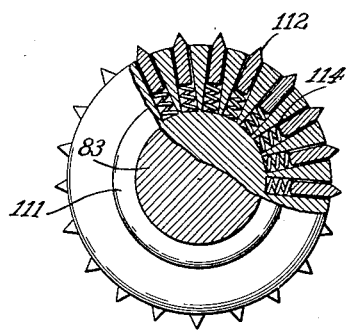
Fig. 16 is an elevational and partially sectional view of the cutting off roller, showing the construction and disposition of the knives therein.

Broadly speaking, my novel process comprises transforming a material into a plastic state by admixture with a vaporizable liquid, forcing the plasticized material through an elongated tube, or a number of tubes arranged in parallel, that are heated to such a temperature that the vaporizable liquid contained in the plasticized material will be brought to a temperature considerably above its boiling point. The vaporization of said liquid, that is to say, its transformation into a vapor, is, however, prevented by the fact that the material and liquid are confined under high pressure in the said tubes. As the admixed material and liquid traverse the tubes, it may also be cooked by the heat applied, although this is not entirely essential as pre-cooked material may be employed for carrying out the process. Furthermore, in case of products that are not intended to be edible, the cooking may not be essential.

When the material has completely traversed the said tubes, it is extended or allowed to issue from one or more suitable orifices, which may be round, square, polygonal, oval, rectangular, annular or any other desired shape; although I prefer an orifice that will cause the material to assume the shape of a tube. A number of heating tubes may issue at their termini into a common header or crown which is in communication with one or more extruding nozzles. This arrangement of the tubes is particularly advantageous as it enables the material to travel more rapidly through the cooking apparatus, as the friction, when tubes are thus arranged, is very much less than if a long continuous tube were employed.

Furthermore, as the material passes from the tubes into the common header, it will be thoroughly mixed and blended so that a more uniform product will issue from the extruding nozzles. As the material issues from the extruding nozzles, the vaporizable fluid, being superheated relatively to its boiling point at ordinary atmospheric pressure, will immediately flash into vapor, and in so doing, will suddenly expand the material with which it is admixed, causing it to assume a porous, cellular structure. At the same time, especially when an annular orifice is used, the hollow interior of the extruded tubular material will be enlarged, so that the tube produced by said extrusion will be larger in both inside and outside diameters than the size of the annular orifice, and the cross-sectional area of the walls of the said tube will be greater than the corresponding area of the annular orifice.

As thus far described, and when using an annular orifice, it will be seen that my process would produce a continuous length of expanded tubular material, and the process might be stopped at this point, and the tubes of expanded material might be cut into suitable lengths.

However, I contemplate compressing and cutting said tubes, while still partially plastic, at regular short intervals, so as to form individual sealed objects, tubular in shape, but with their ends squeezed flat and sealed by the cohesion of the material.

Furthermore, I surround the extruding nozzle or nozzles by a chamber heated to a temperature considerably above the boiling point of the vaporizable liquid contained in the plasticized material, so that the extruded, puffed and expanded material may readily be dried.

A final heating or toasting operation may follow the forming of the individual sealed hollow objects, this depending entirely upon the nature of the material treated.

In order to obtain more highly cellular and expanded objects, I may also introduce a compressed gaseous fluid into the material which has been mixed with the vaporizable liquid, so that the final puffing of the material will be the result of the expansion of said gaseous fluid combined with the vaporization of the vaporizable liquid.

Referring to Fig. 1 of the drawings, the material to be treated or puffed, is admixed with a vaporizable liquid and, if desired, also impregnated with a gas under pressure, and placed into a suitable container 30 which is capable of being tightly sealed, and from which the admixed materials may be forced by mechanical pressure. Only the end of said container is shown in the drawings, as it may consist of the cylinder of an hydraulic press; may be the discharge end of a continuous mechanical extrusion machine; or other suitable device for forcing a plastic material to flow under pressure, although I have found an hydraulic press to give the most uniform and steady pressure.

The end of the said pressure-chamber 30 is directly coupled to a steam-jacketed connecting link 40, containing a plurality of tubular members affording a through passage for the compressed dough-like material in chamber 30. Similar tubes, disposed in a steam-chamber 50 serve to conduct the compressed dough to the extruding die 60, which is connected with the tubes in chamber 50 by a common header 55 in the end thereof, and a single intermediate tube 56. These tubes are preferably arranged in a circle, as will be described in greater detail in connection with Figs. 9 to 12.

The tubes through which the material flows end in a common header or crown 55 that is in connection with an extruding die 60. Said die is located in a heating chamber, herein termed the "primary oven" 70, so that the extruded material 100 will be surrounded by an atmosphere of highly heated air to insure the complete vaporization of the vaporizable liquid admixed with the material. As the means of heating this chamber are a matter of choice, no particular method of so doing is illustrated, but it may be stated that I have found the introduction of a current of heated air, so as to traverse the primary oven from the top toward the bottom, to yield satisfactory results.

Figure 17:
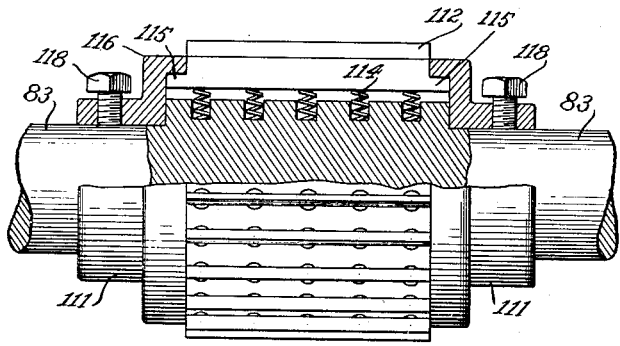
Fig. 17 is a side elevation, and partially sectional view of the same roller shown in Fig. 16.

The string, tube, ribbon or the like of extruded puffed material travels downwardly by gravity, and passes through a special form of rotary cutting rollers, Figs. 3, 16 and 17, that are actuated by gears.

The said cutting device consists of a smooth roller 110 and a roller 111 having a plurality of sharp knives 112 that serve to not only cut the tube of material into lengths, but to seal up the severed ends of the pieces so that closed hollow bodies similar to those shown in Fig. 4 will result. In Figs. 1, 2 and 3, these objects are designated by the number 101.

After leaving the cutting rollers, the now closed hollow objects 101 fall through a suitable chute 80 into the end of a rotary toasting oven 90. A spiral flange 91 in the said toaster serves gradually to propel the objects 101 through the toaster. As the toaster 90 is of standard construction, only one end of it is shown. The toaster itself does not form a part of the present invention.

In Fig. 2 there is illustrated, in cross-section, a portion of tubular extruded material in the puffing or expanding stage. It will be seen that the material being extruded from the annular opening formed by the hole in the die 60 and the pin 69 centrally located in said hole, has fairly thin walls. Almost immediately after issuing from the annular openings, the water within the material being extruded become steam, causing the walls to become cellular, while at the same time the inside diameter of the tubular extruded material 100 becomes greater than that of the pin 69. This effect is brought about by the sudden vaporization of the liquid mixed with the material being treated, and by the expansion of any compressed gas that might also be present, as already explained.

The final form of the objects produced in the case just cited is somewhat similar to that of an over-stuffed pillow, having been formed by the squeezing shut and sealing of a section of a tube. In Fig. 4, a side elevation of one of the objects is shown; Figs. 5 and 6 being cross and longitudinal sectional views, respectively.

My process may be used for producing puffed or steam expanded materials of various kinds, but the process, while in no way limited, is especially suitable for the production of a highly novel form of breakfast food from various cereals or other starchy-materials such as potatoes, tubers and green bananas, in which the starch has not yet been converted into sugar.

In order to facilitate an understanding of my novel process and enable those skilled in the art to practice the invention, I will now describe several ways of treating various materials, the broad underlying idea being similar in all. It is further to be distinctly understood that the actual size and shape of the articles produced is a matter of choice.

Example I

I may take wheat flour which may be bolted or finely ground with part of the bran removed if desired. Thus wheat semolina may be used. It is not essential that the flours used be finely ground or bolted. They may be coarsely ground whole grains and contain bran and small gritty parts, such as flours known as "mill run". This flour may be mixed in a dough mixer with water and other liquids or flavoring ingredients, giving to the flour a total moisture percentage of from 30 to 35%. This more or less plastic material is then put in the pressure chamber 30 where it may be subjected to a pressure of from 3000 to 5000 pounds per square inch or higher. The material is then forced through the pipes leading through the heating chamber so that the material becomes cooked under compression while passing through these pipes. The moisture contained in the material is confined, absorbs heat units, and is ready to burst into steam as soon as the material escapes from the die 60. In this instance, a steam pressure of about 175 pounds may be maintained in the heating chamber corresponding to a temperature of 375° F.

In order to maintain pressure in the tubes, it is necessary that the combined cross-sectional area of the orifice in the die be such as to prevent too rapid a flow of material. The orifices may be of any shape desired, round, square, oblong or annular, to form the material into the desired shape.

The material as it passes through the tubes under great pressure and heat becomes fused together and glue-like and rubbery in its structure. It is also more or less plastic because of the starch which it contains. This compressed plastic fused cereal flour may now be compared to the material in a grain of cereal, such as rice or wheat, in that it is greatly compressed and reduced in volume as compared with its volume in its flour form. The material in the heating chamber becomes resistant to the rapid escape of the moisture contained therein so that when the material escapes from the orifice and the moisture flashes into steam it greatly enlarges the volume of the material or "puffs" the same. The puffing is instantaneous and explosive. The sudden and great expansion of the material explodes the starch granules and otherwise breaks up the solid rubber-like material in substantially the same way as whole grains of cereal were broken up and puffed by my previous methods.

The heat applied renders the product sterile. The high temperature of the material emerging from the nozzle and the explosive effect of the moisture makes drying rapid and easy, a large percentage of the moisture escaping in a few seconds. To further facilitate the drying and to prevent the now puffed and porous product from collapsing, the product is not allowed to cool off at once but emerges directly into the drying chamber or "primary oven" 70, where it is subjected to a relatively high temperature at the beginning, higher than the temperature in the cooking tubes. When the material reaches the cutting rollers, it is still sufficiently pliable to withstand this action without crumbling. The final drying and toasting, as already explained, takes place in the toasting oven 90.

It is understood that the pressures and temperatures used may be varied to suit conditions and the product desired. By lowering the pressure, the speed of flow of the material at the orifice is reduced. By lowering the temperature in the cooking chamber, less heat is absorbed, and less cooking takes place.

In this process, the percentage of starch in the product being treated can be very small on the one hand, and on the other hand pure starch can be used, the resulting product varying considerably with the amount of starch contained. Thus, wheat bran can be treated without adding any starch to it, since it contains sufficient starch to act as a binder. Wheat flour having any percentage of bran, e. g., 25 to 75 percent or more, can be treated. When the material contains a very small percentage of starch the puffing is less than when a greater amount of starch is present.

It has been found that when a maximum puffing is desired, a speed of ten feet per second of the material at the die is essential. When the maximum puffing or porosity is not desired the pressure is reduced to cause a slower flow and the temperature in the cooking tubes may be correspondingly reduced.

If it is desired that all of the starch granules be broken up, a temperature of 300° F. to 400° F. is needed. If only a slight disruption of the starch granules is desired, a temperature of 225° F. may be used. If desired, a material which has been previously cooked can be treated. In the case of a previously cooked material, a temperature as low as 165° F. would be sufficient to fuse the starch together and make it plastic enough to be inflated with carbon dioxide gas, for example, thus enabling the material to be puffed without subjecting it to high heat.

Another advantage of being able to use any desired temperature is that I may treat plastic materials which cannot stand high temperatures without scorching and destroying important ingredients, such as acids, volatile substances and flavors, aldehydes, vitamines and the like. The process can be absolutely controlled so as to retain these essential ingredients substantially in their natural state.

Example II

I may take rice flour ground from whole rice or rice grits, flavoring it if desired, and adding enough water to bring this moisture content up to about 35 percent. The flour and water are thoroughly and evenly mixed to make the material as plastic as possible so that it can be forced from the pressure chamber through the heating chamber where it becomes cooked, tenacious, fused together and resistant to the rapid escape of moisture when released. It is well known that rice flour contains no elastic gluten, hence a real dough, such as wheat flour dough, cannot be made from it. However, it has been found that a sufficiently plastic mass can be made from it so that it can be forced through the cooking chamber under a somewhat higher pressure than that used with the wheat flour. I have found that the cooking of the starch-containing material tends to make it pass through the tubes more quickly and with less friction than if it were forced through cold. This is due to the fact that the starch in the flour becomes plastic when subjected to heat and moisture, making it "slippery". Furthermore, the heating of the material in the tube causes a further pressure to be developed which has a tendency to move the material in the tubes toward the nozzle where it is released.

As the material passes through the heating chamber, the moisture therein becomes highly heated, so that it expands into steam at the instant it is released from pressure. The material as it escapes from the nozzle is expanded into a cellular porous structure due to the resistance which the material offers to the escape of the moisture.

This resistance is explained as follows: When the material containing moisture is heated under great pressure, the starch granules become hydrated more or less and swelled slightly, pressing upon each other to such an extent that their surfaces adhere together. This action converts the flour into a solid compact mass which is resistant to the escape of the moisture contained therein, since now the moisture cannot escape by passing in between the granules, but must pass or diffuse through them, which requires some time. Therefore, the more instantaneously the puffing takes place, the larger and more even the puffed product becomes. When the moisture is allowed to diffuse out slowly through the surface of the material, considerably less expansion takes place. This explains the necessity of the high speed that should be given the material at the nozzle. The more rapid the flow, the quicker the pressure release. It will be understood that the pressures and temperatures may be varied as desired within certain limits. By this method rice flour can be made into forms like vermicelli, spaghetti and macaroni which are now made only from wheat flour. By this process, partially cooked products can be quickly prepared for food.

In treating rice flour also, carbon dioxide or other compressed gas can be injected into the compression chamber when desired to assist the steam in puffing the product.

Example III

Pure starch, such as corn starch, potato starch, or any starch, no matter what its origin, can be treated and puffed, making a porous product in which all of the starch granules are exploded and disrupted so that when the product is dried and ground up, a starch flour results which may be used as a food, in laundry work, or as a dry paste.

In carrying out this method, enough water is added to dry starch to give it a total moisture content of about 40%, or starch can be taken direct from the starch runs where it already contains about this percentage of moisture.

When pure starch is treated, a considerable percentage of moisture must be present in order to make it plastic enough to be forced through the heating or cooking pipe. A pressure of 4000 to 5000 pounds per square inch may be used for forcing the material through the cooking tube, where the starch granules are fused together, making a solid rubbery mass resistant to the escape of moisture. As the material emerges from the orifice, the pressure is almost instantly reduced to atmospheric, and the moisture in the material flashes into steam, inflating and puffing the material. The material is dried just as in the example previously described and may be used in ribbon, strip or tube form, or ground up into a starch flour.

Example IV

In this method, a gas such as carbon dioxide is forced into the material which is treated. Wheat flour dough may be used, to which sufficient water is added to make the material plastic. This elastic dough is then preferably divided into small pieces about the size of kernels of corn. These pieces are then put into the compression chamber which is then sealed up air-tight.

Carbon dioxide is then injected into the compression chamber up to a pressure of about 200 pounds per square inch. This gas now becomes intimately mixed with the dough disseminating evenly throughout the whole mass in about two minutes. The carbon dioxide gas is then turned off and the gas charged dough is subjected to a mechanical pressure of from 2000 to 5000 pounds per square inch, depending on the material used and the percentage of moisture. Thus, with a dough having 30 percent moisture, a pressure of 5000 pounds would be used but with a dough containing 35 per cent moisture 2000 pounds would be enough. This high pressure converts the dough into a very solid compact mass, much the same as a brick. By reason of this, the carbon dioxide gas has now become so thoroughly mixed with the dough that it has become gas saturated, even the moisture of the dough holding much of the carbon dioxide gas. The starch granules are also thoroughly saturated with the gas. The gas charged dough is then forced through the heating chamber and into the drying chamber as in the examples previously described.

If desired, the material after being charged with gas may be taken out of the pressure chamber and held for a time after further treatment, as the compressed dough will hold the gas within it for a considerable time, losing it slowly by diffusion. Several hours might elapse before all of the gas would escape.

The purpose of using the gas is explained as follows: It is known that bread is made porous mainly by means of carbon dioxide gas as in the process of fermentation when yeast is used, or as in the case where baking powder is mixed with glutenous flours in which carbon dioxide gas is generated. Bread has also been made by intimately mixing carbon dioxide gas with wheat flour dough in sealed mixing chambers where the dough becomes mixed with the gas which, when the bread is baked in the oven, expands and raises the bread just as when yeast or baking powder is used for the generation of carbon dioxide.

My process differs entirely from the above-outlined methods in that I subject the whole gas-charged mass to high mechanical pressure and then force this material through a heating chamber and allow it to escape through an orifice where the compressed gas expands and assists the steam in puffing the material. Most of the moisture in the dough escapes at the nozzle at the instant the pressure is reduced. What moisture remains is quickly given off in the oven. The product is sufficiently dried in one or two minutes. The design in using the carbon dioxide gas in conjunction with the steam is that the gas assists the steam in holding up the puffed cells or pores and preventing the material from collapsing in drying.

The use of the carbon dioxide increases the porosity of the material especially when thicker tubes are desired. It has been found that when the desired product is to be from ¼ to ¾ of an inch thick, the use of carbon dioxide is desirable. When the product is thinner, around ⅟₁₆ of an inch, the use of carbon dioxide would be detrimental as it forms gas bubbles on the surface of the product, leaving the crust uneven and broken in places. This is especially true when a high charge of carbon dioxide is given to the dough bricks in the compression chamber.

When carbon dioxide is used and a low temperature is used in the heating chamber, but a well puffed and porous product is desired, then the carbon dioxide assists materially in the puffing process. Enough heat must be given to the material to cause it to become plastic and resistant, otherwise the carbon dioxide gas would tear the product to pieces at the nozzles or make a rough product. In cases where the wheat flour dough is in itself plastic, only a low heat is necessary, since the compressed carbon dioxide itself expands considerably without the aid of steam enough to puff the material. The carbon dioxide gas acts instantly, at the nozzle, expanding the material and preventing its collapse, while drying in the oven.

*Example V*

Flour made from Indian corn is used. Water is added to bring the moisture content up to about 35 percent, making a plastic material. It does not form a dough but remains in a granular condition. This material is put in the compression chamber, sealed up and impregnated with carbon dioxide gas at a pressure of about 200 pounds per square inch. This gas pressure is maintained for a minute or two, during which time it becomes intimately incorporated in the corn flour mass, the minute particles and starch granules becoming as saturated by diffusion.

A mechanical pressure of about 2000 pounds is now given the material which compresses it together with the carbon dioxide gas into a solid brick-like material. This is forced through the heating chamber which is kept at a temperature of about 375° F. by means of the steam jacket surrounding it. As the material escapes at the nozzle, inflation and puffing is effected by means of the expanding gas and steam. When the product is dried in the drying chamber, a puffed corn product results.

*Example VI*

White potatoes containing as high as 75 percent water may be used. These are peeled and steamed, converting them into a plastic or mashed form in which the starch is partly cooked. The material is placed in the compression chamber and subjected to a pressure of about 2000 to 3000 pounds per square inch forcing it through the heating tubes. The puffing and drying takes place as previously described.

In this connection it may be well to explain another result of the process when treating material such as potatoes having a high moisture content. Such a material, containing 75 percent water occupies about three times the volume which it occupies when air dry. When this material is forced through the heating tubes and escapes from the die into the drying oven where a high temperature of around 575° F. is maintained a quick surface drying takes place, leaving the moisture inside the material practically intact. The sudden heating and drying of the surface of the material leave a rigid shell-like skin which now prevents the material from collapsing on further drying. As the material passes along the drying chamber, the temperature becomes less and less, the temperature at the outlet of the drying chamber being around 250 to 300° F. As the moisture which was on the inside of the material dries out, it leaves the material porous, the space occupied by the moisture before drying forming innumerable pores which, as the material is being dried, are filled first with steam and finally with air.

Starch material products are poor conductors of heat, hence the interior or central portion of the material remains cooler than the surface long enough for the surface to dry and create a rigid crust or shell which prevents collapsing.

It may be explained here that the material in the drying chamber is not exposed to the high temperature more than ½ minute or so and during this time its temperature does not rise above 375 to 400° F., because the evaporation from this surface is so rapid at this point that it keeps itself sufficiently cool to prevent scorching.

*Example VII*

Green bananas are used before their starch has turned into sugar. These are roasted, peeled and mashed. In this condition they contain about 70 percent moisture. They are then mixed with an equal weight of a cereal flour, and put into the pressure chamber and forced through the heating chamber where a temperature of about 375° F. is maintained. When this material flows out of the nozzle at a temperature of 375° F. and a speed of about ten feet per second, it is inflated by the volume of steam and forms a puffed product. The drying takes place as previously described, forming a crust on the material which prevents its collapse as it is dried.

This method of first causing the material to puff by steam inflation, and then maintaining this inflation by high heat while drying causing a still greater porosity on account of the moisture loss, makes it possible quickly to treat, in a continuous and economical way, such plastic products as white and sweet potatoes, bananas and the like.

*Further explanation*

The comparatively high temperature employed in treating the starchy material while it flows through the cooking tubes, followed by the explosive expansion that ensues the moment the material issues from the extruding nozzle, serves to disrupt completely the individual starch grains, so that the finished product will contain no unbroken starch grains. In this respect my product differs from ordinary baked food products, such as bread, cake, crackers, etc., in which the starch grains, although they might have burst open or have become distorted, are still recognizable as such when the bread is examined under the microscope.

The appearance of the starch grains in the dough as it is placed in the compression chamber is shown in Fig. 7, which shows some individual starch grains. The very small objects also to be seen in this figure are in all probability small particles of gluten and aleurone. The magnification in the said figure is practically 2300 diameters.

The appearance of a section of the walls of the finished material made from the same flour of which the unbroken starch grain is shown in Fig. 8, at a magnification of 1500 diameters. This figure was made from a sketch drawn directly from the microscopic appearance of the material when it was stained with iodine to render the starch visible. The starch in this instance stained blue, showing that the dextrinization of the same was not very severe, and had probably not progressed much beyond the amylodextrin stage. It will be at once seen that all vestiges of the original starch grain have disappeared and that the starch has been converted into anamorphous mass distributed more or less uniformly throughout the material.

It is evident that a wide range of temperatures may be given to the material, not only while being treated for cooking but also while being dried in the oven. I have found that cooking temperatures may vary between 225 and 400° F. and those of the drying and setting chambers may vary also, although from 575 to 600° F. appears to be the best oven temperature to form a rigid setting crust. These variations of treatments permit the porosity of the resulting product to be made practically anything desired, from a product which is only slightly porous to a product in which the volume may be ten times that of the original.

This process provides an instantaneous method for disrupting starch granules of all kinds, regardless of origin. This is accomplished by means of a steam explosion inside of the starch granules themselves. This disruption is so instantaneous and explosive in its nature that for a few seconds after the disruption takes place, the starch is still in a plastic condition in which it can be molded, cut off and made into any desired shape. In other words, the starch is in a semi-dry paste form which, as it sets, acts as a binder for the other material mixed, thus fusing all of the material together, allowing it to be molded, almost like dough.

The material as it escapes from the nozzle should be resistant to the escape of moisture and the pressure released should be sudden or instantaneous.

When the material escaping from the nozzle has a moisture content between 10 and 20 percent it dries itself on exposure to the air. When it is between 20 and 35 percent very little extra drying is needed, beyond a couple of minutes in a hot oven.

By my new method, materials containing a high percentage of moisture, as high as 75 percent, may be puffed and still remain swelled and porous when dry.

It is clear that when the material comes out of the die, the moisture which has been heated to a temperature of 375° F. expands into steam instantly and inflates the material, puffing it up to several times its original volume.

If this condition of inflation temperature and live steam can be maintained, and the temperatures even increased to drive off the surplus moisture, while still retaining inflation or puffed, a surface of crust will be forced on the material which will prevent the internal portion of the material from collapsing and shrinking.

This would cause a still greater porosity in the product when dry because of the drying out of the 75 percent of water. In drying there results, therefore, on the inside of the crust material a shrinking up and porous formation, the solid pores fusing together into dividing membranes between pores.

To accomplish the desired quick drying, I proceed as follows: It has been found that a large percentage of the moisture is given off at the die or nozzle when the pressure reduction to atmospheric takes place. To continue this rapid drying and giving off of steam from the material, I keep the nozzles in the oven at a temperature of around 600° F. Furthermore, air at 600° F. is blown on the material so as to carry the moisture away as soon as it is given off. This high temperature not only acts quickly to dry the material but keeps the steam inside the material in its gaseous state and thus prevents the collapse of the material until the drying has continued to a point where the excess moisture is driven off and the cells have become rigid. This first instantaneous formation of a rigid crust-like surface on the material when expanded by the formation of steam I have called "setting" as it prevents the material from collapsing and retains the size and volume in which it was puffed.

It is clear that this method of rendering plastic material porous depends on two things: first, there takes place a steam expansion and inflation of the material (already enlarged on account of the relatively high moisture content) and, second, the puffed material is kept in its inflated enlarged size by means of a temperature higher than the temperature to which it was subjected in the heating chamber. The drying and evaporation is thus increased and the moisture further heated so as to keep it at or near the steam flush point. The material is then carried quickly through a dry oven having a decreasing temperature toward the outlet, the temperature decreasing from around 600° F. at the nozzle to a temperature of 225° F. at the outlet of the drying chamber. It has been found that as high as 50 percent. of moisture can thus be taken out of the puffed material in from 2 to 3 minutes and 75 percent. moisture material in 5 minutes. When dry the product thus made remains perfectly crisp and preserved practically indefinitely.

When the cereals are made up into the form of the sealed hollow puffed objects already described, they form a very attractive and palatable article of food. As there is a decided crispness in the material by reason of the toasting step, the penetration of moisture into the otherwise cellular material is inhibited. In actual practice of the process, mixtures of various cereal flours, and/or vegetable materials are employed. The difficulty or ease of cutting the extruded tubular puffed material up into individual sealed pieces differs somewhat, depending upon the particular materials used. For commercial purposes, wheat flour, properly seasoned and flavored, gives excellent results.

In actual operation with seasoned and flavored wheat flour, the following data were obtained:

Extrusion speed at orifice____500 feet per minute
Pressure in cooking tubes about__4200 lbs. per sq. in.
Steam pressure surrounding cooking tubes__125 lbs. per sq. in.
Steam temperature_____350° F.
Primary oven temperature_____575° F.
Desirable moisture in dough_____33⅓ percent
Toasting oven temperature_____475° F.
Time in toasting oven__2 to 5 minutes, depending upon the desired degree of toasting.

I desire it to be understood that by the word "puffing" I mean the inflation of the vegetable material described in connection with my present process by the sudden expansion of a vaporizable liquid which has been superheated and will, therefore, substantially instantaneously flash into vapor, thereby expanding the material with which it is admixed.

In the case of cereal products, "puffing" results from the expansion of the water contained in the material or admixed therewith. As this water, being superheated, suddenly changes into steam, there will be a very great increase in its volume thereby rendering the material undergoing treatment porous. It is this phenomenon that I refer to herein as "puffing".

In order that the carrying out of my present invention may be thoroughly understood in all its mechanical details, I will now give a minute description of the apparatus employed in the production of the puffed hollow form of my novel food product of vegetable origin.

Fig. 9 shows the end of the pressure chamber 30, which, as already stated, may be either the cylinder of an hydraulic press, a screw press or of any other device which is capable of compressing a plastic material of dough-like consistency and causing the same to flow under pressure; as for example a so-called macaroni-press, stuffing machine, or similar device, such as is well known in the art of forcing plastic materials to flow.

The said chamber 30 is in communication with elongated tubes 41 within a cylindrical steel shell 42 by means of an interconnecting arrangement broadly designated as 40. The said linking arrangement consists of a metallic flange 43 which is bolted to a similar flange 44 by means of suitable bolts 45. The part 46 of the connecting link 40 has a number of openings 47 therein, as for example ten of them, arranged with their centers on a circle, the said openings being in direct communication with a similar number of metallic tubes 41. The said tubes 41 are screwed into part 46 by means of suitable threads, whereas the other ends of the said tubes 41 are ground so as to be capable of being accurately fitted to a metallic flange part 51 which forms one end of the cylindrical steel chamber 50. Suitable openings 52, ground, so as to make a tight fit with the aforesaid ends of the tubes 41, and located with their centers coaxial with the aforesaid tubes 41 are provided in the part 51. The tubes 41 are rigidly supported in accurate alignment by the connecting link broadly designated by the figure 40 and their accurate adjustment is insured by a number of long bolts 45.

The intermediate link 40, containing the connecting tubes 41, is also enclosed with a steam-tight jacket 42, so that the tubes 41 may be kept hot, although the temperature herein need be but slightly above the boiling point of water, or 212° F. This is necessary in order to lessen the internal resistance of the dough that is being forced through tubes 41, and especially as in a flour containing large amounts of corn starch is employed, as the latter is only capable of plastic flow when heated substantially above room temperature. Suitable connections 48 for the admission of steam are shown, there being similar openings 49 for discharge of condensed water.

The cylindrical chamber 50 carries within it a plurality of elongated narrow metallic tubes 53, preferably made of seamless copper tubing, and which tubes are threaded into the part 51, already referred to; being arranged in said part with their centers in a circle and coaxial with the tubes 41, so that when the connecting link 40 is attached to the cylindrical chamber 50, the tubes 53 will be in communication with the tubes 41 in a straight line. The tubes 53 are either threaded into or expanded into a plate or dome 54 located at the opposite end of the aforesaid cylindrical chamber 50, and are in turn covered by a dome-shaped metallic member 55, which, as the same tubes 53 thereby are all in communication with the interior dome-shaped space in the member 55 causes the latter to act as a common header for the said tubes 53. Pressure tight connection is established between the part 54 on the end of the cylindrical chamber 50 and the said dome-shaped member 55, the cap screw 55a serving to fasten the parts together so that they may be pressure tight. Suitable threaded openings are provided in the said cylindrical chamber 50 so that steam may be admitted thereto through the tubes 57 and any condensed water discharged through the tube 58, which forms a common collecting tube for any water condensed in chamber 50, with which it communicates through the openings 59.

The shape of the header 55 is not altogether a matter of indifference, and I prefer a form as shown in Fig. 9. As will be seen from this figure, the tubes 53 terminate abruptly and flush with the plate 54 into which they are fastened by expanding, somewhat analogous to the method employed in setting the tubes in steam-boilers, except that in the present case care is taken that no part of the tube extends beyond the plate 54. The reason for this is that otherwise there might be "dead spots" for the accumulation of non-moving plastic material which would thus be prone to burning and charring.

To insure the continuous, even and uninterrupted forward movement of the plastic material that issues from the tubes 53 toward the single connecting pipe 56, the plate 54 has a protruding center 54a, thus steering the forward-moving plastic material directly toward the connecting pipe 56. The effect is somewhat like that of a crown, the converging streams of moving plastic material finally merging into a single stream that passes through the connecting pipe 56 to the extruding die 60, which is described hereinbelow.

It has been found advantageous to make the connecting tubes 41 of such size that they may be threaded into the header-plate 46, that connects with the hydraulic pressure chamber 30. Likewise, the cooking tubes 53 should be of slightly smaller internal diameter than the connecting tubes 41, so that no "dead corners" may exist for the accumulation of plastic material that is not actively flowing through the apparatus at all times. Any material which would be caught in such "dead corners" would be over-cooked and possibly scorched, and if any particles of this should afterwards become dislodged and carried along with the stream of plastic material, they might lodge in the extrusion die and cause the same to become plugged up, thus interrupting the smooth operation of the apparatus.

As will be seen from the construction, the tubes 53 are surrounded by the chamber 50, and by admitting steam under pressure into the said chamber through the tubes 57 the contents of the tubes 53 may be heated to any desired degree depending upon the steam pressure applied to the said chamber 50.

In order to be able to effect a rapid and convenient method of assembling the apparatus shown in Figs. 9 to 12, various special devices, now to be described are employed.

The intermediate part 40 in reality consists of a number of sections. One of these comprises the steam-jacket 42. As will be seen from the construction shown in Fig. 9, one end of this makes steam-tight contact with the end 46 of the chamber 30 being attached thereto with bolts or cap-screws. The other end of the steam-jacket 42 is closed by the flange 43, which, in turn, has the flange 44 super-imposed upon it; suitable gaskets 42a and 43a being provided to render the assembled sections steam and pressure tight. The exact method of assembly is plainly shown in Figs. 9 and 11. In Fig. 11, which is on an enlarged scale, it should be noted that the circular plate 51 into which the tubes 53 are screwed is somewhat enlarged near its periphery and provided with a ground surface 51a, so that a pressure tight joint will be formed by contact of flange 43 with plate 51. In order to hold this joint tight, a wedge 151 that passes through a slot 152 in an extension of the plate 51 is provided. When this wedge 151 is driven home in its slots 152, it will not only force the ground edge 51a of the plate 51 tightly against the flange 43, but will also cause the tubes 41 to be seated tightly against the ground joints 52 provided in the plate 51, as already herein referred to.

In order to disassemble the arrangement shown in Fig. 9, when it is desired to clean or adjust the tubes 53, it is only necessary to loosen the long cap-screws 45, when it will be possible to move the chamber 50 with all its assembled parts bodily away from the part 40 and its parts, by driving up the wedge 151. Other obvious modifications in the detailed construction may be made, provided only that means be provided for ready and simple assembly and disassembly of the apparatus.

The header or crown 55, already referred to, is held to the end of the steam-chamber 50 by means of cap-screws 55a, which are screwed into a flange 50a screwed onto the chamber 50. The plate 54 with its protrusion 54a is interposed between the dome-shaped part 55 and the flange 50a, the cap-screws 55a passing both through 55 and 54. A suitable gasket 50b insures a steam-tight connection, while a ground joint 55b is depended upon to prevent passage of the dough under pressure. The tubes 53, being expanded into plate 54, may be completely withdrawn, while attached to the same, from the chamber 50, as the plate 51 is so dimensioned that it may slide through the interior of chamber 50, when it is disconnected from the tubes 41 and the wedge 151.

It is believed that the description, in connection with Figs. 9, 10, 11 and 12, will make the further elucidation of the construction of this portion of the apparatus superfluous.

Referring to Figs. 13, 14 and 15, it will be seen that chamber 70 is a vertical chamber substantially square in cross-section and made either of metal or any non-combustible material; the walls are made so that they will act as heat insulators as the current of heated air traverses the chamber during the operation of the machine. The heating of the chamber may, however, be accomplished by other means than the passing therethrough of heated air, and it would be within the scope of my present invention to heat the chamber by means of hollow walls through which hot gases or steam are passed, or, alternatively, to place electric resistance wires along the walls of the said chamber, the object to be attained being the raising of the temperature of the interior of the chamber to a fairly high degree, as for example substantially 575° F.

In the upper part of the chamber 70 there is an opening on the side thereof through which the pipe 56 leading to the extruding die 60 passes. The extruding die may have one or more orifices, but for the purposes of the present description it will be assumed that there is but one orifice.

As already hereinbefore described, the extruded material issuing from the orifice, at the bottom of the die 60, falls downwardly by gravity through a guiding funnel 71, which, in turn, is in open and loose engagement with a second pivotally mounted guiding funnel 72, which latter funnel is provided with a handle 73 passing through the wall of the chamber 70 so that it will be possible to swing the said funnel 72 out of its vertical position and thereby to deflect the extruded material and to cause the same to issue from the side of the chamber 70 through a suitable door 73.

In order to enable an inspection of the functioning of the apparatus, glass doors are provided in the upper part of the chamber such as 74 and 75, and the lower part of the chamber at 76. In order to allow the extruded material to be thrown out of the machine when desired by means of the guiding funnel 72, a downwardly pendant hinged door 73 is provided at the end of the machine; this door is so arranged that upon the return of the pivoted funnel 72 to its vertical position the said door 75 will automatically close.

At the lower part of the chamber 70 there is located a cutting arrangement which is shown in the top plan view in Fig. 15, in which figure it is shown in its position below the chamber 70.

This cutting arrangement and construction, comprises two rollers, one of which is provided with a plurality of cutting knives whose function it is to sever the extruded tubes of plastic material into individual pieces, while at the same time sealing up the ends of said pieces, as already herein described in detail. This cutting arrangement or "cut-off rollers" as they will hereinafter be referred to for the sake of simplicity, are driven by two sets of gears 81 and 82 supported on suitable shafts and bearings so that the motion of the cut-off rollers and of the platen roller will be at the same peripheral speed. The distance between the two rollers, or, in other words, the pressure applied by the knives against the platen roller can be very accurately adjusted. This is accomplished as follows:

The bearings for the platen roller 110 and for the cutting roller 111 are located at both ends of the shafts 83 and are in the form of bearing-blocks 84, which are slidably mounted and normally kept apart from each other by compression springs 85. The said bearing-blocks 84 can be forced toward each other and against the action of the springs by means of the screws 86 so that the distance between the rollers can be adjusted with very great accuracy and can be kept in such adjustment by virtue of the constant pressure exerted by the springs 85 which tend to keep the rollers apart.

The roller 111, which performs the cutting operation, carries a plurality of knives 112 which are accurately adjusted within the said roller, as will be more completely set forth in the description of the cutting device which is illustrated in detail in Figs. 16 and 17. The bottom of the chamber 70 is open so as to allow of the discharge of the material to be cut. A suitable chute or funnel, or a traveling belt or any other conveying device is placed below said cutting device to remove the cut material, and to transfer it to a toasting oven. As already explained hereinbefore, the toasting oven 90 is of standard construction and is, for this reason, not described in detail as it does not form a part of the present invention.

The top of the chamber 70 is preferably closed, but is provided with a duct or chimney so as to carry the heated air into the chamber, the method of introduction and removal of the air being a matter of entire indifference and of convenience. As shown in Figs. 13, 14 and 15 the chamber 70 is constructed of double walls of sheet metal 77, the space between the said walls being filled with mineral wool or other insulating material 78, the purpose being to conserve the heat within the said chamber. As will be seen in Figs. 13 and 14, the extruding die 60, is visible through the glass doors already described so that the operation of the machine can be controlled without the necessity for opening any of the doors, so that cold air drafts can be avoided. The only time in which the machine may be opened to the air for a few moments is whenever the extruded material is being guided by the pivoted funnel 72 through the hinged door 73. The purpose of this arrangement is to allow the temporary removal of the material, if for any reason the cutting rollers fail to function properly or require adjustment.

The cutting device used is of peculiar construction and embodies a number of special features that render the same particularly suitable for its purpose. Referring to Figs. 16 and 17, it will be seen that the cutting portion of the cutting arrangement shown diagrammatically in Fig. 3, comprises a slotted roller 111, carrying a plurality of knives 112 in said slots. These knives are supported in said slots by a number of compression springs 114, and are kept from falling out of the slots by being provided with extensions 115 which are held by a circular flange member 116 secured to the shaft 83 that carries the roller 111 by means of a cap screw 118. The total distance that the knives can react against the springs may be on the order of ⅛ inch, and, preferably, the springs are under an initial compression corresponding to a like distance, so that, when the knives are forced down against the springs by contacting with the smooth platen roller 110 (shown only in Fig. 3), the maximum pressure to which they will be subjected will be roughly twice that of the pressure with which they are held against the circular flange 116.

The advantages of this method of constructing the cutting arrangement are as follows. It was found that even when the distance between the rollers 110 and 111 was accurately adjusted, that the gradual wear of the sharp edges of the knives would wear a groove in the smooth roller, and this would necessitate a further adjustment. This is obviated by having the knives under a definite pressure, so that they will more or less automatically take up any wear that occurs, so that they may be kept in accurate working condition for a long period without the necessity of interrupting the operation of the machine.

The rollers are operated by being driven by the rotation of their shafts 83 which are keyed to gears 81 and 82, shown in Figs. 13, 14 and 15. The number of teeth in these gears is so proportioned that the peripheral speed of the two rollers, that is to say, the peripheral distance around the extreme edges of the cutting knives 112 and that of the smooth roller will be the same.

It is to be understood, that the speed of rotation of the rollers is properly balanced against the extrusion speed of the material issuing from the extrusion die 60; and that suitable driving means, not shown, are provided to actuate the gears 81 or 82.

The gears 81 and 82, their shafts 83, and the bearing-blocks 84 as well as springs 85 are all supported on a suitable cast iron or steel frame 120, which may have any suitable shape. This frame also serves as the bottom support for the chamber 70, and is so proportioned that a receiving funnel 80 may be placed beneath it to receive the individual cut objects 101, and to transfer the same to the toasting oven 90.

Figure 18:
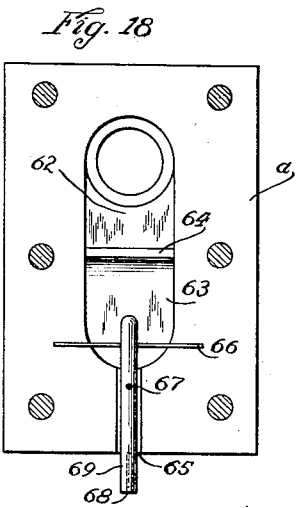
Fig. 18 is an elevational view of the rear interior of the extruding die or nozzle used for producing tubular extruded material.
Figure 20:
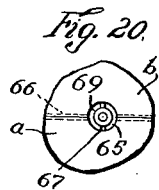
Fig. 20 is a partial end view of the said nozzle, looking in the direction of the arrows 20—20 in Fig. 19.
Figure 19:
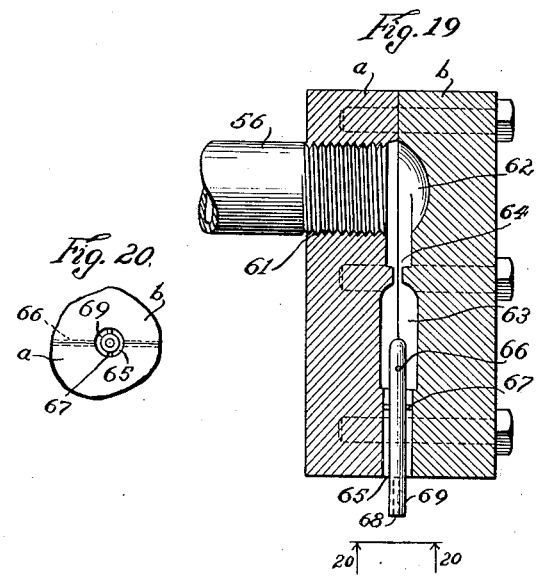
Fig. 19 is a side elevational sectional view of the extruding die or nozzle.

The extruding die 60 is shown in detail in Figs. 18, 19 and 20, and is of unique construction, having a number of features which renders it specially adaptable for this purpose.

The die 60 consists of two halves $a$ and $b$ as will be seen in the cross-sectional view in Fig. 19. The half $a$ is provided with a threaded opening 61 which leads to a duct or chamber 62 which, in turn, communicates with a second chamber 63. Between the said chambers 62 and 63 there is a constriction 64 which serves a very important purpose. The object of restricting the space through which the material may flow is to insure absolute uniformity of the material before it is allowed to extrude through the orifice 65. The width of the constriction 64 is so chosen that approximately as much material may pass between it as will be extruded from the lower chamber 63. It will readily be understood that by reason of the highly insulating qualities of the dough passing through the heating tubes 53 the center of the moving mass of plastic dough will not be quite as hot as those portions that are in close proximity to the sides of the said tubes. As the material enters the crown or dome 55 from the tubes 53, a certain amount of mixing will take place, but this will not be quite sufficient for perfect operation.

However, as the plastic material squeezes itself through the constriction 64 a very intimate mixing will take place. The material therefore issues from the constriction 64 as a thin ribbon, which is at once again broken up by the resistance offered to its progress by the material already in chamber 63. The latter I prefer to call an homogenizing chamber as a still further blending and homogenization of the heated plastic material takes place therein.

As already explained above, the initial pressure given to the material by the hydraulic press is about 5000 lbs. per square inch, and this pressure will have fallen to about 4000 lbs. per square inch at the point where the material reaches the constriction 64. If the material were simply allowed to extrude without these chambers and constrictions, the pressure would fall considerably below 4000 lbs. at this point, and as a result thereof the material would not expand with the suddenness that it does when the extrusion takes place under the conditions as herein outlined and explained.

The two halves a and b when bolted together constitute the die 60 which is provided at its lower extremity with a round opening 65 through the center of which there extends a pin 69, of slightly smaller diameter than the hole 65, so that when the said pin is accurately centered in the said opening there will result an annular orifice, as is best seen from the bottom view shown in Fig. 20. The pin 69 is held within the opening 65 by means of a transverse pin 66 which lies within a groove which is cut into each half of the assembled die 60. In other words, if the two parts a and b are taken apart, one half of the groove, a hemispherical groove, will be in each half of the die 60, but when the two parts are assembled together and fastened by means of the bolts and nuts shown, this pin 66 will serve to hold the pin 69 down in position. Small protrusions 67 also serve to center the pin accurately in the hole 65.

When the material enters the die through the opening 61 and passes downwardly from the chamber 62, past the constriction 64 into the lower chamber 63, the hydrostatic or plastic pressure of the material will force the material out of the annular orifice. The pin 69 may have a hollow 68 drilled into the center of the same, so that it may be lighter at this point and hence retain less heat.

In actual practice, the following dimensions of the pin and opening, constriction and chambers, have been found to give particularly good results, especially when working with the cereal flours in which wheat and rye are present. The diameter of the hole 65 may be 220/1000"; the diameter of the pin 69 194/1000" so that the wall or space remaining between the hole and the pin would be 13/1000". The chamber 63 is preferably ¼" thick and ¾" wide, while the space 64 left by the constriction will be from 12/1000" to 15/1000", but has been found to operate satisfactorily as high as 22/1000". The opening 61 works well with a ½" pipe while the chamber 62 may bulge into the half b of the die 60 to the extent of ¼".

The two halves a and b have carefully ground smooth surfaces so that when the die is assembled by means of the cap-screws shown there will be no possibility of the plastic material issuing from any other point except the orifice. On disassembly and removal of the pin 69 the entire interior of the extruding die is open for inspection, cleaning and repair, making a very handy and useful arrangement which lends itself to practical operating conditions.

The material of which the apparatus is constructed consists for the most part of steel, iron or bronze, although, as already indicated, the pressure cooking tubes 53 are preferably made of seamless copper tubing, as this will withstand the necessary pressure both internally and externally. The extruding nozzle 60, shown in Figs. 18, 19 and 20, is made of bronze or nickel, but may be plated upon its interior with a non-corrodable metal, which may be precious metal such as gold or platinum, or a non-oxidizing metal such as chromium. The cap-screws, however, are of steel, as this arrangement, by reason of the difference in the coefficient of expansion of steel and of bronze, will insure a tight joint.

While not in any way limiting myself to the size of the apparatus, it has been found that if the heating chamber 50 is made 4' 3⅜" long and 5.76" inside diameter it will accommodate ten of the cooking tubes 53. The size of these tubes are ⅜" and they are preferably reinforced upon the ends upon which they are threaded into the end 51 of the chamber 50 by having brazed thereto on their outside a ½" tube which carries the necessary threads. The dimensions of the extruding nozzle have already been given. The cutting rollers are preferably 4½" in diameter. The knives are 3" long and ⅝" from base to cutting edge, the angle made by the two sides of the knife being 60°. The shafts of the cutting roller as well as of the platen roller against which the knives operate is preferably 2" to insure large bearings and smooth shockless operation. The primary oven or chamber 70 may be 7' over all, 2' 4" deep and 2' ¼" wide. It may, however, be circular or an oval.

Obvious modifications in the apparatus, changes in the size of the various parts, variations in the method of attachment of tubes and of the means for holding the knives on the cutting rollers, and the construction in detail of the bearings, gears, and the like, may be made without departing from the scope of my present invention as far as it relates to the apparatus herein described.

Modifications in the process described, in the exact shape of the product, and such changes as would lie within the skill of one familiar with the art into which this invention naturally falls, are also to be considered within the spirit and scope of my invention, for which I claim the following:

1. An apparatus for making a puffed product, comprising a pressure chamber having a plurality of openings therein, elongated tubes aligned with said openings and connected thereto, a heating jacket surrounding said tubes for at least a portion of their length, a header for said tubes at the end thereof opposite to their connection with said pressure chamber, one or more extruding nozzles in said header, and means for conveying material extruded from said nozzle out of said apparatus.

2. An apparatus for puffing a plastic material containing a heat-expansible substance, which comprises the combination of pressure means for forcing said plastic material to flow, an elongated narrow chamber through which said material flows, a heating jacket surrounding said chamber, an extruding nozzle at one end of said chamber, a heating chamber surrounding said nozzle, and means for conveying the material extruded from said nozzle out of the apparatus.

3. Means for treating cereal dough comprising a plurality of heated passages through which the dough is forced, a common header in communication with said passages, and an extruding nozzle in communication with said header, through which nozzle the said dough is extruded.

4. Apparatus for producing continuous lengths of puffed cereal product which comprises means for causing a plastic material to flow, elongated passages through which said material flows, a heating jacket surrounding said passages, a common header in which said passages terminate, and an extruding nozzle in communication with said header.

5. Apparatus for producing continuous lengths of tubular puffed cereal product which comprises means for causing a plastic material to flow, elongated passages through which said material flows, a heating jacket surrounding said passages, a common header in which said passages terminate, and annular extruding nozzles in communication with said header.

6. Apparatus for producing individual puffed objects from cereals, which comprises means for causing a plastic material to flow, elongated passages through which said material flows, cooking means comprising a heating jacket surrounding said passages, a common header in which said passages terminate, an extruding nozzle in communication with said header, and means for cutting material extruded from said nozzle into pieces.

7. Apparatus for producing individual hollow puffed objects from cereals, which comprises means for causing a plastic dough to flow, elongated passages through which said material flows, cooking means comprising a heating jacket surrounding said passages, a common header in which said passages terminate, an annular extruding nozzle in communication with said header, and means for cutting tubular material extruded from said nozzle.

8. Apparatus for producing individual hollow puffed objects from cereals, which comprises means for causing a plastic dough to flow, elongated passages through which said dough flows, cooking means comprising a heating jacket surrounding said passages, a common header in which said passages terminate, an annular extruding nozzle connected with said header, and means for cutting tubular material extruded from said nozzle, said means comprising a roller having cutting knives arranged on its periphery and running longitudinally thereof, and a smooth roller platen co-operating with said knives.

9. Apparatus for manufacturing a puffed food product comprising a heating chamber, a plurality of tubes for the passage of plastic dough extending through said heating chamber, a header in communication with the outlet ends of said tubes, an orifice from said header, and means for applying pressure to the plastic heated dough to force it through said tubes into said header and extrude it through said orifice whereby the moisture in the dough expands as steam to puff the material as it is extruded.

10. Apparatus for manufacturing a puffed food product comprising an orifice, means for applying pressure to plastic dough and extruding it through said orifice, means for supplying sufficient heat to said plastic dough prior to its extrusion to cause the moisture in the dough to expand as steam to puff the material as it is extruded, and means for applying sufficient heat to the material after it is extruded to cause it to become set in its puffed condition.

11. Apparatus for manufacturing a puffed food product comprising an orifice, means for applying pressure to plastic dough and extruding it through said orifice, and means for toasting the material after it is extruded.

12. Apparatus for manufacturing a hollow puffed food product comprising an annular orifice, means for applying pressure to plastic dough and extruding it through said annular orifice in the form of a tube, means for supplying sufficient heat to said plastic dough prior to its extrusion to cause the moisture in the dough to expand as steam to puff the material as it is extruded and means for cutting the extruded tube into sections and closing the ends of the sections.

13. Apparatus for manufacturing a hollow puffed food product comprising, an annular orifice, means for applying pressure to plastic dough and extruding it through said annular orifice in the form of a tube, means for supplying sufficient heat to said plastic dough prior to its extrusion to cause the moisture in the dough to expand as steam to puff the material as it is extruded and means for cutting the extruded tube into sections and closing the ends of the sections while the material is still plastic, and means for toasting the sections.

14. Apparatus for manufacturing a puffed food product comprising a heating chamber, a plurality of tubes for the passage of plastic dough extending through said heating chamber, a header in communication with the outlet ends of said tubes, an orifice from said header, and means for applying pressure to the plastic heated dough to force it through said tubes into said header and extrude it through said orifice whereby the moisture in the dough expands as steam to puff the material as it is extruded, said tubes and header being connected together and removable together as a unit from said heating chamber.

15. Apparatus for making a hollow cereal product comprising means for extruding cereal dough in the form of a tube, means for cutting the tube thus formed into sections and closing the ends of the sections, and means for applying heat to the sections to prevent their collapse.

16. Apparatus for making a hollow cereal product comprising means for extruding cereal dough in the form of a tube, means for simultaneously pinching the walls of the tube together and severing the tube at intervals to form sections of tubing, the ends of which sections are closed, and means for applying heat to the sections to prevent their collapse.

ALEXANDER PIERCE ANDERSON.

CERTIFICATE OF CORRECTION.

Patent No. 1,924,827.                                                           August 29, 1933.

ALEXANDER PIERCE ANDERSON.

It is hereby certified that error appears in the printed specifications of the above numbered patent requiring correction as follows: Page 2, line 20, for "no" read not; page 12, line 86, claim 11, after "orifice" insert the words and means for supplying sufficient heat to said plastic dough prior to its extrusion to cause the moisture in the dough to expand as steam to puff the material as it is extruded; and line 97, claim 12, after "sections" second occurrence insert the words while the material is still plastic; and that the said Letters Patent should be read with these corrections therein that the same may conform to the record of the case in the Patent Office.

Signed and sealed this 14th day of November, A. D. 1933.

F. M. Hopkins (Seal)                                             Acting Commissioner of Patents.